(12) United States Patent
Soman et al.

(10) Patent No.: US 10,325,116 B2
(45) Date of Patent: Jun. 18, 2019

(54) DYNAMIC PRIVILEGE MANAGEMENT IN A COMPUTER SYSTEM

(71) Applicant: VMware, Inc., Palo Alto, CA (US)

(72) Inventors: Sisimon Soman, Sunnyvale, CA (US); Arnout Grootveld, Mountain View, CA (US); Arindam Nag, San Ramon, CA (US); Matt Conover, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/639,558

(22) Filed: Jun. 30, 2017

(65) Prior Publication Data

US 2019/0005267 A1    Jan. 3, 2019

(51) Int. Cl.
| | | |
|---|---|---|
| *G06F 21/00* | (2013.01) | |
| *G06F 21/62* | (2013.01) | |
| *G06F 21/56* | (2013.01) | |
| *H04L 29/06* | (2006.01) | |

(52) U.S. Cl.
CPC ........ *G06F 21/6281* (2013.01); *G06F 21/564* (2013.01); *H04L 63/0815* (2013.01); *H04L 63/20* (2013.01); *G06F 2221/032* (2013.01); *G06F 2221/2149* (2013.01)

(58) Field of Classification Search
None
See application file for complete search history.

(56) References Cited

U.S. PATENT DOCUMENTS

| | | | | |
|---|---|---|---|---|
| 5,113,442 A * | 5/1992 | Moir | ................... | G06F 21/6218 340/5.54 |
| 6,289,462 B1 * | 9/2001 | McNabb | ............. | G06F 21/6218 726/21 |
| 7,383,437 B1 * | 6/2008 | Dik | ........................ | G06F 9/468 713/164 |
| 7,669,050 B2 * | 2/2010 | Blinick | ................... | G06F 9/468 713/164 |
| 8,074,288 B2 * | 12/2011 | Sambotin | ............ | G06F 21/6227 713/164 |
| 8,442,960 B1 * | 5/2013 | Meyer | ..................... | H04L 67/14 707/694 |
| 8,677,477 B2 * | 3/2014 | Kim | ........................ | G06F 21/53 713/164 |
| 2002/0188649 A1 * | 12/2002 | Karim | ..................... | G06F 21/53 718/104 |
| 2005/0091658 A1 * | 4/2005 | Kavalam | ................. | G06F 21/31 718/104 |

(Continued)

Primary Examiner — Jeffery L Williams
(74) Attorney, Agent, or Firm — Patterson + Sheridan, LLP (57) ABSTRACT

An example method of dynamic privilege management in a computer system includes: detecting launch of an application by a user in a login session of a desktop executing on the computer system; determining identification information for the application; evaluating at least one policy that specifies requirements for privilege elevation using the identification information as parametric input; generating a privilege elevation result for the application, the privilege evaluation result including a positive or negative indication of whether the at least one policy permits privilege elevation of a process created for the application within the login session; and elevating privilege of the process in response to the positive indication in the privilege elevation.

18 Claims, 8 Drawing Sheets

(56) References Cited

U.S. PATENT DOCUMENTS

| | | | | |
|---|---|---|---|---|
| 2005/0289545 | A1* | 12/2005 | Blinick | G06F 9/468 718/100 |
| 2006/0053426 | A1* | 3/2006 | Dive-Reclus | G06F 21/53 719/328 |
| 2006/0253909 | A1* | 11/2006 | Cherepov | G06F 21/554 726/26 |
| 2007/0050369 | A1* | 3/2007 | Stiegler | G06F 21/53 |
| 2007/0199068 | A1* | 8/2007 | Russinovich | G06F 12/1491 726/16 |
| 2008/0134325 | A1* | 6/2008 | Kim | G06F 21/53 726/21 |
| 2009/0328129 | A1* | 12/2009 | Desai | G06F 21/6209 726/1 |
| 2014/0201830 | A1* | 7/2014 | Kim | G06F 21/53 726/17 |
| 2016/0149924 | A1* | 5/2016 | Iverson | H04L 63/083 726/4 |
| 2017/0111368 | A1* | 4/2017 | Hibbert | H04L 63/105 |
| 2017/0235958 | A1* | 8/2017 | Khosravi | G06F 9/4406 726/1 |

* cited by examiner

DYNAMIC PRIVILEGE MANAGEMENT IN A COMPUTER SYSTEM

BACKGROUND

Today's enterprises rely on defense-in-depth mechanisms to protect endpoint computing devices from malware infection. Enterprises no longer rely on just traditional signature-based antivirus software, but rather have started to adopt technologies like role-based network containerization, smart network-level detection, and machine learning-based malware behavior detection. Traditional antivirus software cannot detect zero-day attacks. Instead, it may take a few days to weeks to update new malware signatures on every endpoint device. Additionally, most advanced detection and prevention systems work well only when the endpoint device is within the premises.

Once malware gains access to an endpoint, the malware attempts to control the device and use lateral movement mechanisms to spread to other endpoints and critical assets of the organization. Removing local administrator rights from domain user accounts active on the endpoints can limit an attacker's ability to move beyond the point of entry. Without administrator privileges, however, some legacy applications will not function correctly or at all. In addition, for bring-your-own-device (BYOD) endpoints, employees expect to retain administrator privileges on the endpoints. It is thus desirable to remove the need to retain full administrator privileges for domain users on endpoints, while maintaining functionality of legacy applications and meeting expectations of users.

SUMMARY

Techniques for dynamic privilege management in a computer system are described. In an embodiment, a method of dynamic privilege management in a computer system includes: detecting launch of an application by a user in a login session of a desktop executing on the computer system; determining identification information for the application; evaluating at least one policy that specifies requirements for privilege elevation using the identification information as parametric input; generating a privilege elevation result for the application, the privilege evaluation result including a positive or negative indication of whether the at least one policy permits privilege elevation of a process created for the application within the login session; and elevating privilege of the process in response to the positive indication in the privilege elevation.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
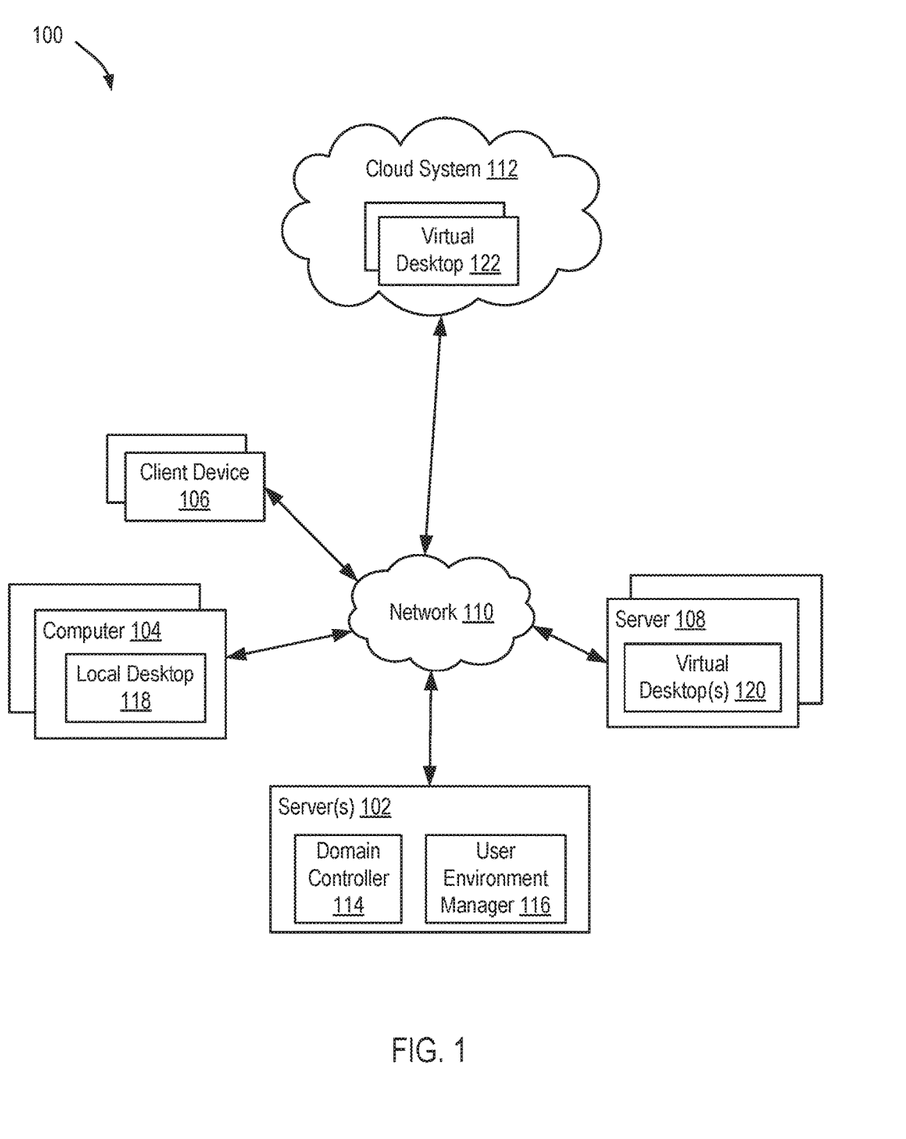
FIG. 1 is a block diagram depicting a networked computer system according to an embodiment.

FIG. 1 is a block diagram depicting a networked computer system 100 according to an embodiment. Networked computer system 100 includes one or more servers 102, computers 104, client devices 106, and servers 108, each coupled to a network 110. Network 110 can include local area network(s), wide-area network(s), and the like. Server(s) 102 execute software to implement a domain controller 114. Domain controller 114 manages a domain in which server(s) 102, computer(s) 104, client device(s) 106, and server(s) 108, as well as any virtual computing instance executing thereon, can be members. Domain controller 114 maintains user account information, authenticates domain users, and enforces security policies for objects in the domain.

Each computer 104 includes an operating system that provides a local desktop 118. In general, a desktop includes a graphical user interface (GUI) having icons, windows, toolbars, folders, wallpapers, desktop widgets, and the like, a command line interface (CLI), or a combination thereof. Local desktop 118 is presented locally to a user by an operating system executing on a computer 104. Computers 104 can be desktops, laptops, tablets, mobile telephones, or the like. For each computer 104 that is a member of the domain managed by domain controller 114, the respective operating system requires domain users to authenticate to domain controller 114 before starting a login session of local desktop 118.

Servers 108 can be computers having a conventional computing architecture (e.g., an x86 architecture). One or more of servers 108 can include virtualization software that manages multiple virtual machines (VMs). Each VM includes a guest operating system that provides a virtual desktop 120. Such a scheme is generally referred to as virtual desktop infrastructure (VDI). A virtual desktop 120 functions like a local desktop 118, but is accessed by users remotely rather than locally at a server 108. For example, a user can access a virtual desktop using a client device 106. Client devices 106 can be computers, tablets, mobile telephones, or the like. Each client device 106 can include remote desktop client software that is configured to start a remote login session of a virtual desktop 120 using a remote display protocol. The VMs can be members of the domain managed by domain controller 114. In such case, domain users must authenticate to domain controller 114 before starting remote login sessions of virtual desktop environment(s) 120.

In an embodiment, network 110 is coupled to a cloud system 112 (e.g., through the public Internet). Cloud system 112 can include servers that execute VMs having virtual desktops using a VDI scheme. In addition to VDI or as an alternative, cloud system 112 can provide virtual desktops as a service similar to a Software-as-a-Service (Saas) scheme. Virtual desktops 122 in cloud system 112 can be provided by either or both types of schemes. Users can access a virtual desktop 122 using a client device 106 in a manner similar to accessing a virtual desktop 120. The operating systems presenting virtual desktops 122 can belong to the domain managed by domain controller 114. In such case, domain users must authenticate to domain controller 114 before starting remote login sessions of virtual desktops 122.

In some embodiments, servers 108 and/or cloud system 112 execute operating systems that include remote desktop session hosts (RDSH) functionality (e.g., terminal services). In such case, a single operating system can host multiple virtual desktops 120 or virtual desktops 122 concurrently. Thus, a server 108 can include an RDSH-capable operating system that provides multiple virtual desktops 120, where the RDSH-capable operating system can execute directly on the server or within a VM. Cloud system 112 can include similarly configured servers to provide multiple virtual desktops 122.

As used herein, a "desktop" encompasses the various types of local and virtual desktops in which users can create login sessions. In an embodiment, server(s) 102 execute a user environment manager 116. User environment manager 116 offers personalization and dynamic policy configuration across various desktops provided by operating systems of computers 104, servers 108, and cloud system 112 (such operating systems generally referred to as "endpoints"). User environment manager 116 manages the endpoints to present users with personalized and consistent settings across desktops. In an embodiment, user environment manager 116 implements dynamic privilege management on endpoints in the domain managed by domain controller 114. Embodiments of dynamic privilege management are described below. While the techniques of dynamic privilege management are described with respect to implementation by user environment manager 116, such techniques can be applied using different software. Notably, the techniques can be applied using software other than user environment manager 116 (e.g., software having different functionality or software solely providing dynamic privilege management functionality). Further, in some embodiments, user environment manager 116 can execute on a different server from domain controller 114. In still further embodiments, domain controller 114 and/or user environment manager 116 can execute in VMs.

The local security subsystem of an operating system can manage privileges at the user level, but cannot effectively control privileges more granularly at the application level. As noted above, many legacy applications need administrator privileges to execute, which prevents a chief information security officer (CISO) or the like from removing administrator privileges from domain users. In embodiments, the dynamic privilege management techniques described herein allow a CISO or the like to add administrator privileges to certain applications based on some identification information for the application (e.g., application name, location, hash value, publisher details, etc.). With dynamic privilege management, the CSIO or the like can remove administrator privileges from domain users, but still enable designated applications to run with administrator privileges using defined elevation policies (e.g., whitelists). In embodiments, the dynamic privilege management techniques are extended by using reputation checking services, such as Google VirusTotal®, Symantec Insight™, or the like. Reputation checking services have billions of known file details, with reputation categories such as malicious, potentially malicious, clean, and unknown.

In an embodiment, during a login session of a desktop, dynamic privilege management detects launch of an application. Dynamic privilege management evaluates elevation policies and determines reputation based on identification information for the application (e.g., a hash of the application). An application launches with elevated privileges only if allowed by an elevation policy and if the application has a known good reputation. An application launches with de-elevated privileges if its reputation is potentially malicious or unknown. An application is stopped from being launched if its reputation is malicious. Thus, unknown or potentially malicious applications execute with least privilege, which in the case of malware can limit the extend of the attack. Combining privilege management with administrator-defined whitelisting and application reputation checking can remove the need for running antivirus software on the endpoints, pushing antivirus checking out into the network.

Figure 2:
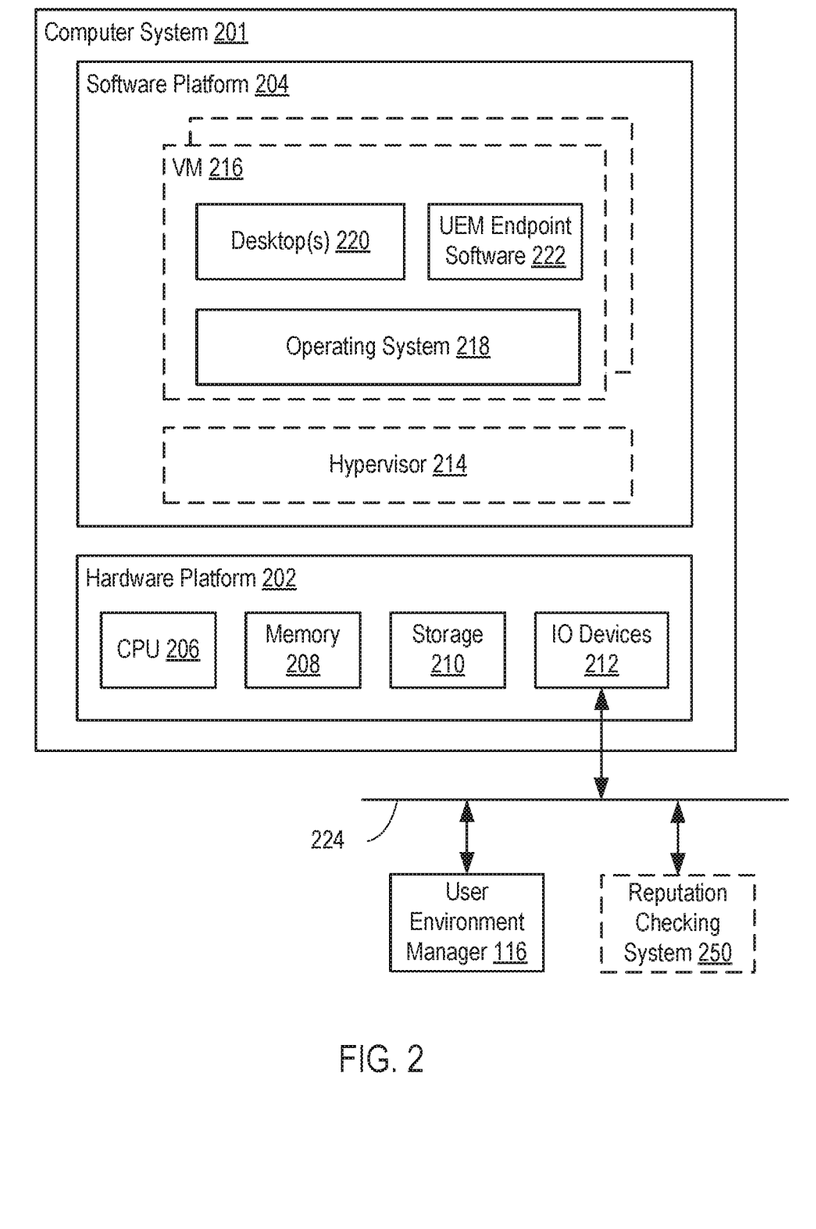
FIG. 2 is a block diagram depicting a computer system according to an embodiment.

FIG. 2 is a block diagram depicting a computer system 201 according to an embodiment. Computer system 201 can be used as any of computers 104, servers 108, or servers in cloud system 112. Computer system 201 includes a software platform 204 executing on a hardware platform 202. Hardware platform 202 may include conventional components of a computing device, such as a central processing unit (CPU) 206 and system memory ("memory 208"), as well as a storage system ("storage 210"), input/output (TO) devices 212, and the like. CPU 206 is configured to execute instructions, for example, executable instructions that perform one or more operations described herein and may be stored in memory 208 and storage 210. Memory 208 is a device allowing information, such as executable instructions, virtual disks, configurations, and other data, to be stored and retrieved. Memory 208 may include, for example, one or more random access memory (RAM) modules. Storage 210 includes local storage devices (e.g., one or more hard disks, flash memory modules, solid state disks, and optical disks) and/or a storage interface that enables computer system 201 to communicate with one or more network data storage systems. Examples of a storage interface are a host bus adapter (HBA) that couples computer system 201 to one or more storage arrays, such as a storage area network (SAN) or a network-attached storage (NAS), as well as other network data storage systems. IO devices 212 include conventional interfaces known in the art, such as one or more network interfaces. IO devices 212 can be coupled to a network 224 for communication with user environment manager 116. In some embodiments described further herein, IO devices 212 can communicate with a reputation checking system 250 through network 224. Reputation checking can be included as a feature of the dynamic privilege management techniques described below.

In an embodiment, software platform 204 includes an operating system (OS) 218 that executes directly on hardware platform 202. Operating system 218 provides one or more desktops 220 and user environment manager (UEM)

endpoint software 222. UEM endpoint software 222 cooperates with user environment manager 116 to implement dynamic privilege management as described further herein. The OS can be any commodity operating system that functions as described below with respect to FIG. 3, such as Microsoft Windows® or like type operating systems.

In another embodiment, software platform 204 includes a hypervisor 214 that executes directly on hardware platform 202 (e.g., a "bare-metal" hypervisor). Hypervisor 214 is a virtualization layer that abstracts processor, memory, storage, and networking resources of hardware platform 202 into one or more virtual machines (VMs) 216 that run concurrently on computer system 201. Virtual machines 216 run on top of hypervisor 214, which enables sharing of the hardware resources. One example of a hypervisor that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Each VM 216 includes an operating system 218 executing as a guest operating system 216. Otherwise, operating system 218 function as described above.

Figure 3:
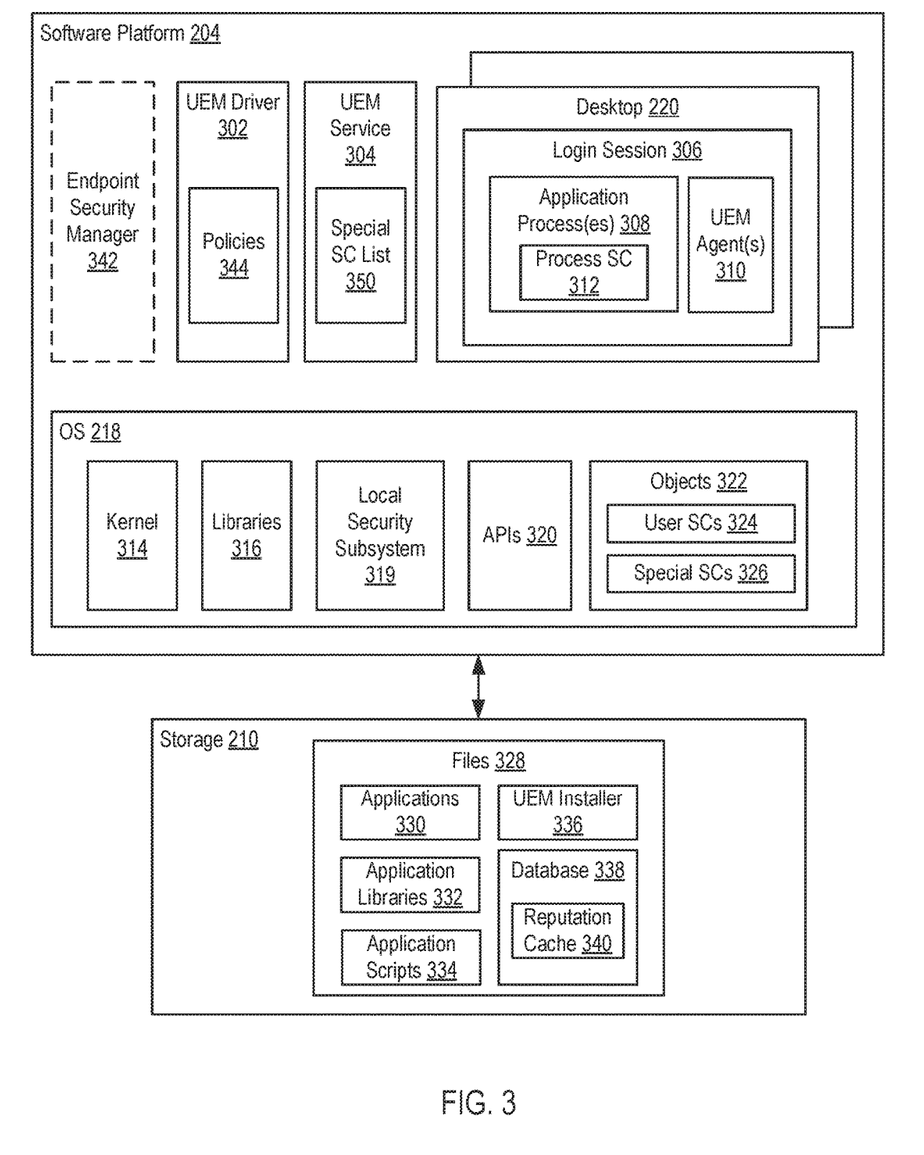
FIG. 3 is a block diagram depicting a software platform of a computer system according to an embodiment.

FIG. 3 is a block diagram depicting software platform 204 of computer system 201 according to an embodiment. Software platform 204 includes an operating system (OS) 218. OS 218 includes a kernel 314, libraries 316, a local security subsystem 319, application programming interfaces (APIs) 320, and objects 322. Kernel 314 provides low-level operating system functions, such as thread scheduling, interrupt and exception dispatching, multiprocessor synchronization, memory management, security, IO, networking, inter-process communication, and the like. Kernel 314 may divide such functionality among multiple components. Libraries 316 can include libraries that are part of kernel 314, and libraries that provide a higher-level interface to kernel 314. Libraries 320 provide APIs 320 (which may be documented or undocumented) that translate functions into native system calls (which are typically undocumented). Local security subsystem 319 includes processes and associated libraries 316 that manage local security of OS 218. Local security subsystem 319 can manage various objects 322. In particular, local security subsystem 319 can create security context (SC) objects, as described further below.

OS 218 provides at least one desktop 220 (depending on whether RDSH functionality is present and enabled). Upon successful login by a user, desktop 220 provides a login session 306. The user can run one or more applications in login session 306, for which OS 218 creates application process(es) 308. Upon a successful login, local security subsystem 319 creates a user SC 324 for login session 306. For example, in a Microsoft Windows® operating system, a user SC 324 is referred to as a primary access token. In general, an SC includes information that describes a user account, security group(s) in which the user has membership, and privileges associated with the security group(s). The SC can include various other information, such as various identifiers, an expiration time, various flags, access control list (ACL) information, and the like. A user SC 324 includes an identifier of the logged-in user, identifier(s) of security group(s) in which the logged-in user has membership, and a list or privileges associated with the security group(s).

In embodiments, the user is a domain user and an administrator configures domain controller 114 so that the domain user has the least privilege necessary to login to desktop 220 and launch applications (referred to herein as "user privileges"). For example, the user can be a member of the "users" security group, but not an "administrators" security group. The administrators security group has more privileges than the user security group (referred to herein as "administrator privileges"). That is, the administrator privileges are elevated with respect to the user privileges. The administrator privileges typically include additional privileges for increased control of OS 218.

OS 218 includes a filesystem subsystem (not specifically shown) for accessing files 328 on storage 210. Files 328 include files associated with applications, such as application executables ("applications 330"), application libraries 332 (e.g., shared libraries, such as dynamic link libraries (DLLs)), application scripts 334, and the like. Files 328 can also include, at least temporarily, a UEM installer 336 that when executed installs UEM endpoint software 222 in the form of a UEM driver 302, a UEM service 304, and a UEM agent 310. UEM driver 302 is a kernel-mode driver, and UEM service 304 is a user-mode service process that executes outside the context of login session 306 (i.e., UEM service 304 is not terminated with termination of login session 306). A UEM agent 310 executes within the context of login session 306. In some embodiments, more than one instance of UEM agent 310 can be executed within login session 306, as described further below. For example, one instance of UEM agent 310 can execute with user privileges, and another special instance of UEM agent 310 can execute with different privileges, as described further below.

UEM agent 310 is configured to communicate with user environment manager 116. UEM agent 310 obtains application elevation policies ("policies 344") from user environment manager 116. Policies 344 specify requirements that applications must satisfy for privilege elevation. UEM agent 310 provides policies 344 to UEM service 304, which saves policies 344 in a manner accessible to UEM driver 302. For example, an instance of UEM agent 310 executes with the privileges of the user and thus may not have sufficient privilege to store policies 344 in the desired location for access by UEM driver 302. UEM service 304 can save policies 344 in a location where non-admin users do not have modify privileges (e.g., a specific location in a configuration store, such as the registry in Windows®). An administrator can define various types of elevation polices, including path-based policies, hash-based policies, and publisher-based policies.

Using path-based policies, an administrator can specify executable file names, folders, file paths, or the like. An application launched from a matching executable file, from a matching folder, or from a matching file path is authorized for privilege elevation. For example, an administrator can define a policy such that all applications launching from C:\Program Files\Office are approved for privilege elevation.

Using hash-based policies, an administrator can specify a hash of an application that is authorized for privilege elevation (e.g., an SHA2 hash or the like). For example, an administrator can define a policy such that an application having an SHA2 hash matching a specific image of Microsoft Word® is approved for privilege elevation (regardless of filename or file path).

Using publisher-based policies, an administrator can specify application publishers. An application signed by such publishers is authorized for privilege elevation regardless of filename, file path, or version of the application. For example, an administrator can define a policy such that all applications signed by Adobe, Inc. are approved for privilege elevation.

Policies 344 can include path-based policies, hash-based policies, publisher-based policies, or a combination thereof. UEM service 304 stores policies 344 for access by UEM driver 302. UEM driver 302 and UEM service 304 function as described in embodiments below to perform dynamic privilege management on software platform 204. In general, dynamic privilege management includes three phases: user login, application launch, and privilege elevation. At user login, UEM endpoint software 222 creates a special SC for the logged-in user that has administrator privileges. UEM endpoint software 222 keeps a reference to special SC and the user's original SC for future use. At application launch, UEM endpoint software 222 evaluates policies 344 to determine whether the application should be elevated. If the dynamic privilege management includes reputation checking, such reputation checking is performed at this point. Application elevation depends on results of the elevation policy check, and application execution can depend on results of the reputation check. For privilege elevation, if permitted by the policy, the application's process SC is replaced with a duplicate of the special SC, which will provide the application administrator privileges.

Figure 4:
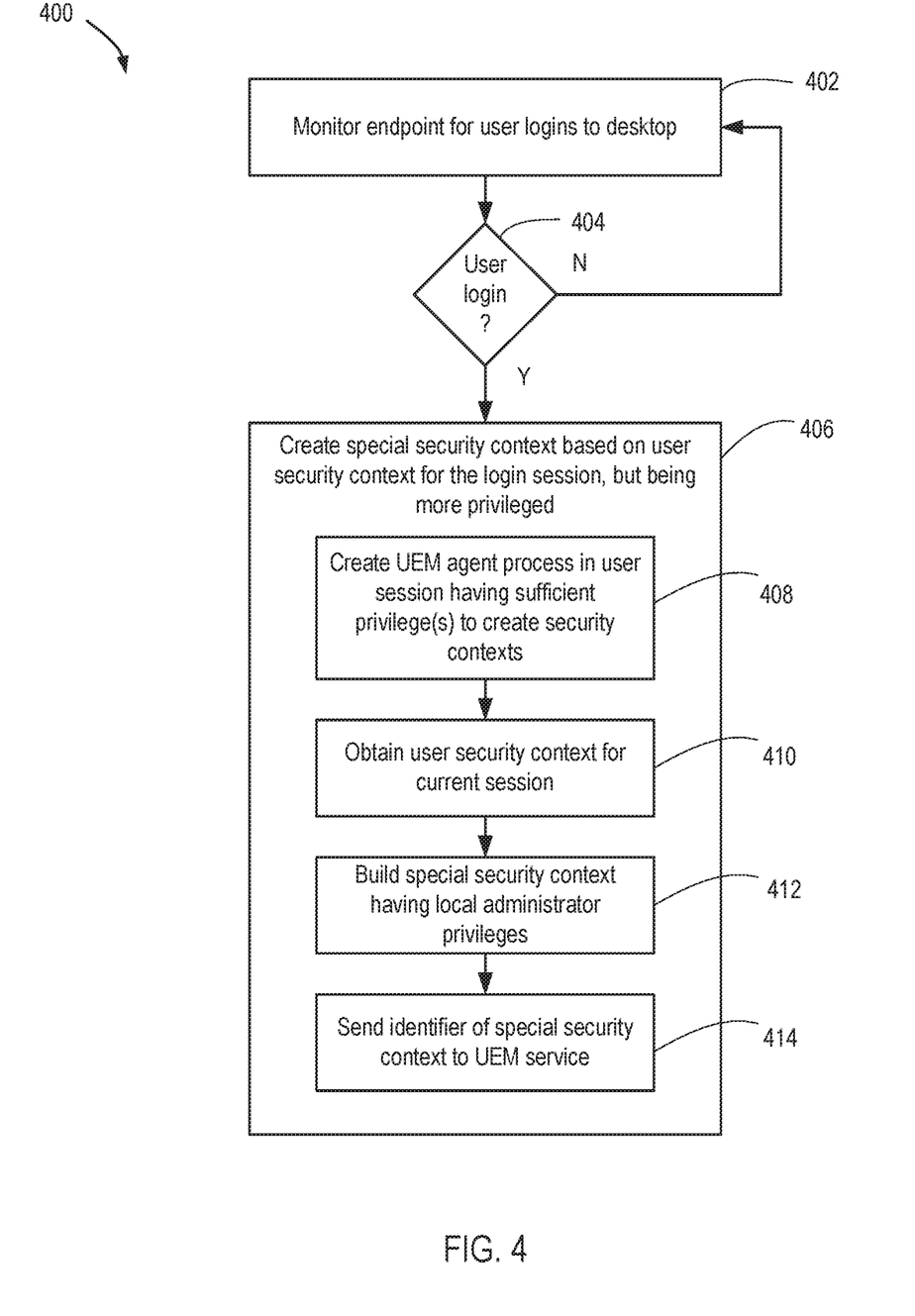
FIG. 4 is a flow diagram depicting a method of monitoring an endpoint for user login in a dynamic privilege management scheme according to an embodiment.

FIG. 4 is a flow diagram depicting a method 400 of monitoring an endpoint for user login in a dynamic privilege management scheme according to an embodiment. Method 400 begins at step 402, where UEM service 304 monitors OS 218 for user logins to desktop 220. In an embodiment, UEM service 304 registers with OS 218 for notification of user logins. In response to user log on, OS 218 sends a notification to UEM service 304 with details of the logged on user. At step 404, UEM service 304 waits for a log on notification from OS 218. If a log on notification is not received, method 400 returns to step 402 and continues monitoring. If a log on notification is received, method 400 proceeds to step 406.

At step 406, UEM service 304 creates a special SC 326 based on a user SC 324 for the login session 306. Special SC 326 includes the attributes of user SC 324, but also includes administrator privileges (whereas the user SC 324 has user privileges). In an embodiment, step 406 begins at sub-step 408, where UEM service 304 creates a process (a special instance of UEM agent 310) within login session 306. This instance of UEM agent 310 is created with privileges sufficient to create security contexts. A normal process does not have permission to create security contexts. Typically, only a process in local security subsystem 319 has such permission to create security contexts. For example, in a Microsoft Windows® operating system, a process known as the Local Security Authority Subsystem Service (lsass) has SeCreateToken privilege enabled to call native APIs and create access tokens. UEM service 304 uses APIs 320 to obtain the SC of the local security process that can create SCs (e.g., the token of the lsass service). UEM service 304 creates the special instance of UEM agent 310 with the process SC of the local security process, which allows the special instance of UEM agent 310 to create SCs (e.g., this instance of UEM agent 310 has SeCreateToken privilege enabled).

At sub-step 410, the special instance of UEM agent 310 obtains a user SC 324 for login session 306 using APIs 320. At sub-step 412, the special instance of UEM agent 310 generates a special SC 326 that includes attributes of user SC 324 (e.g., identifiers, expiration time, flags, user identifiers, security group identifiers, etc.), as well as additional administrator privileges. For example, in a Microsoft Windows® OS, the special instance of UEM agent 310 can create a special token that includes attributes of the logon session token (e.g., IDs, privileges, security identifiers (SIDs) of the user and associated security groups, discretionary access control list (DACL), etc.). The special instance of UEM agent 310 then adds the BUILTIN\Administrators security group to the special token. In an embodiment, local security subsystem 319 also includes integrity control, where processes can execute with different integrity levels (e.g., untrusted, low, medium, high, system, etc.). By default, SCs are created with untrusted integrity. User SC 324 can have an identifier for a particular integrity level. The special instance of UEM agent 310 searches for this identifier and can replace it (or add one if not present) with an identifier for high integrity (e.g., SID S-1-16-1288 in Microsoft Windows Vista® or later). Integrity can be reduced after creation of special SC 326, but not increased. UEM endpoint software 222 can decrease integrity if necessary at the time of application launch.

At sub-step 414, the special instance of UEM agent 310 sends an identifier of special SC 326 to UEM service 304. UEM service 304 can maintain a list of special SCs ("special SC list 350") that includes one or more identifiers of special SCs 326 that have been created for one or more logged in users. The special instance of UEM agent 310 can then terminate.

Figure 5:
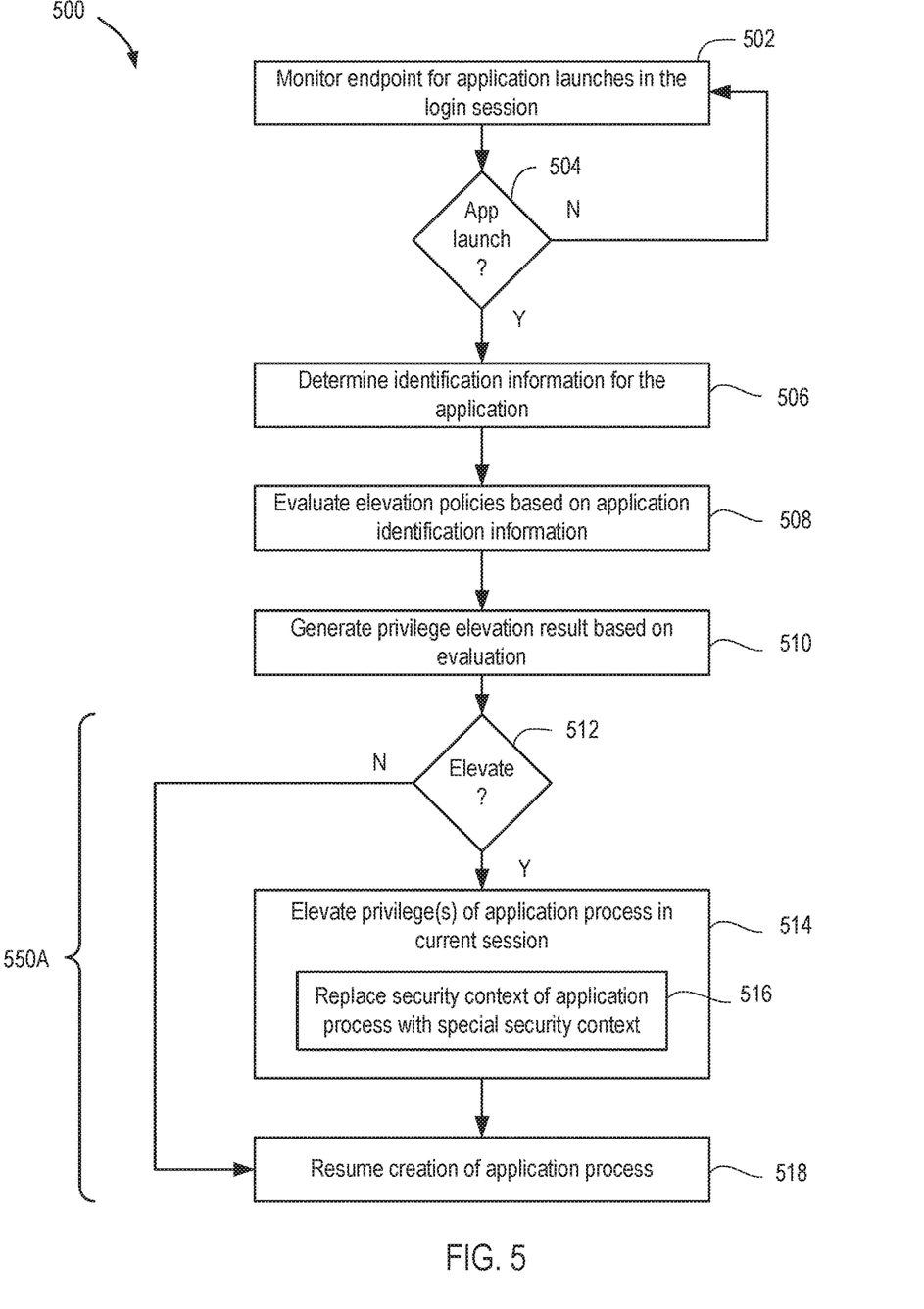
FIG. 5 is a flow diagram depicting a method of handling application launch and privilege elevation in a dynamic privilege management scheme at an endpoint according to an embodiment.

FIG. 5 is a flow diagram depicting a method 500 of handling application launch and privilege elevation in a dynamic privilege management scheme at an endpoint according to an embodiment. Method 500 begins at step 502, where UEM driver 302 monitors OS 218 for application launches in login session 306. UEM driver 302 can be a kernel mode driver that registers with OS 218 for process creation notification. Thus, on every application launch, OS 218 calls UEM driver 302 with details of the application being launched. At step 504, UEM driver 302 waits for such a notification. While none is received, method 500 continues monitoring at step 502. When UEM driver 302 receives a process creation notification from OS 218, method 500 proceeds to step 506.

At step 506, UEM driver 302 determines identification information for the application being launched. UEM driver 302 can obtain some identification information from OS 218 and can compute or determine other identification information. UEM driver 302 can obtain application details from the notification sent by OS 218 for creation of the application process, such as the application file name and application file path. UEM driver 302 can compute or determine other information, such as the application name, application hash value, application publisher, etc. At step 508, UEM driver 302 evaluates policies 344 based on the application identification information. The type of application identification information obtained, determined, and/or computed depends on the format of policies 344 (e.g. path-based, hash-based, publisher-based, etc.). At step 510, UEM driver 302 generates a privilege elevation result based on evaluation of policies 344 at step 508. The privilege elevation result can include a positive or negative indication on whether the application process being created can have elevated privilege. UEM driver 302 can send the evaluation result to UEM service 304 in cases of a positive indication in the privilege elevation result. In cases of a negative indication in the privilege elevation result, UEM driver 302 can resume process creation. Alternatively, UEM driver 302 can send the privilege elevation result to UEM service 304 regardless of whether the result is positive or negative. If the dynamic privilege management scheme also includes reputation check, then UEM driver 302 sends the privilege elevation result to UEM service 304 regardless of the result to check application reputation. This embodiment is discussed further in FIG. 6 below. In the embodiment of method 500, the dynamic privilege management scheme does not include reputation checking.

At step 512, UEM driver 302 or UEM service 304 determines whether the application should be elevated based on the privilege elevation result. If not, method 500 proceeds to step 518, where UEM driver 302 resumes creation of the application process. If the privilege elevation result indicates that application should be elevated, method 500 proceeds to step 514. At step 514, UEM service 304 elevates privileges of the application process in login session 306. In an embodiment, at sub-step 516, UEM service 304 replaces a process SC 312 in the application process with a special SC 326 that includes administrator privileges. Method 500 proceeds to step 518 discussed above. Steps 512-518 of method 500 are part of a privilege elevation phase 550A of the dynamic privilege elevation scheme. An alternative embodiment of the privilege elevation phase that incorporates reputation checking is discussed below with respect to FIG. 6.

Figure 6:
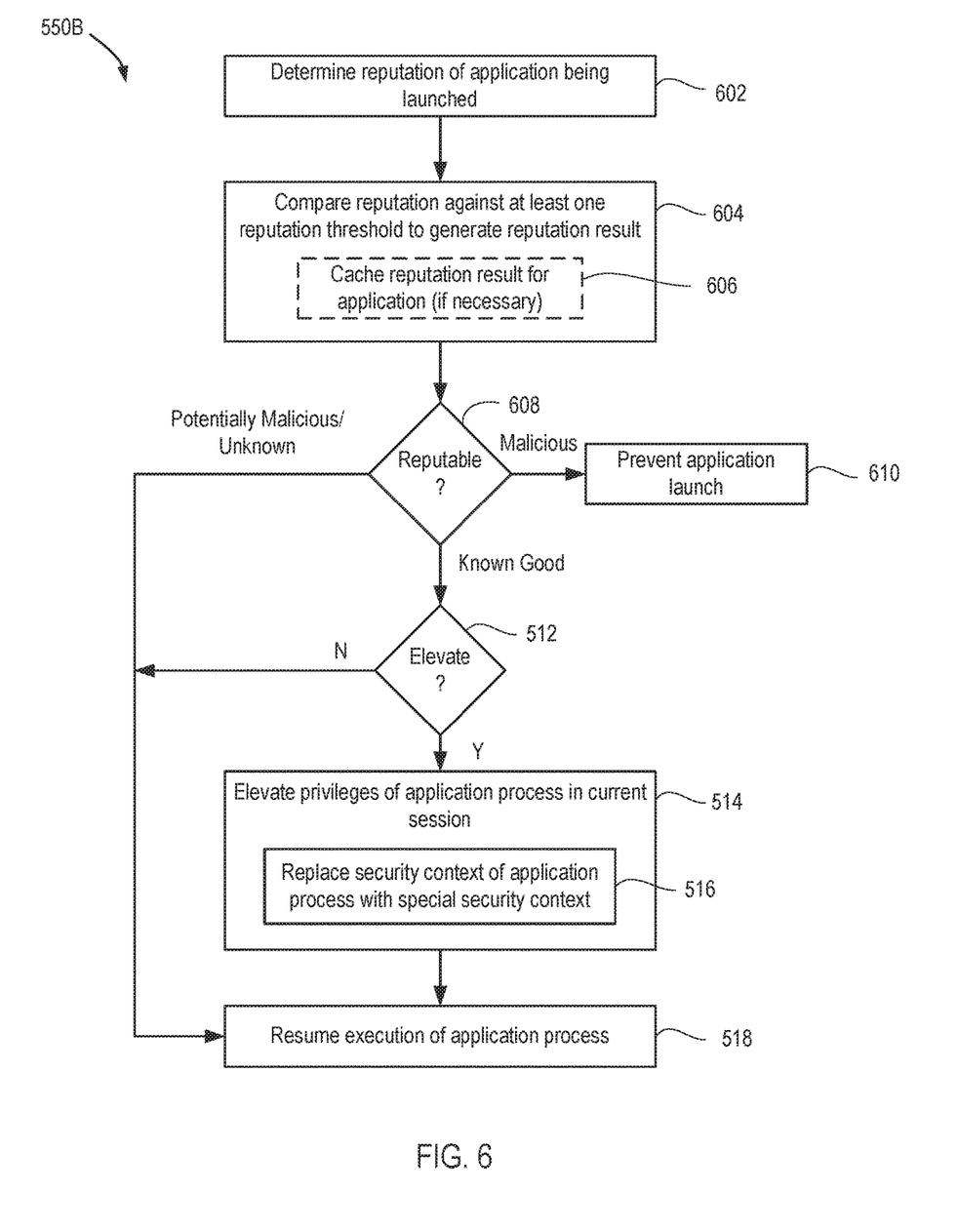
FIG. 6 is a flow diagram depicting a method of privilege elevation with reputation checking for a dynamic privilege elevation scheme at an endpoint according to an embodiment.

FIG. 6 is a flow diagram depicting a method 550B of privilege elevation with reputation checking for a dynamic privilege elevation scheme at an endpoint according to an embodiment. Method 550B begins at step 602, after step 510 in method 500. Method 550B can be used in place of method 550A. At step 602, UEM service 304 determines a reputation of the application being launched. An embodiment of determining reputation for the application is discussed below with respect to FIG. 7. At step 604, UEM service 304 compares the reputation against reputation threshold(s) to generate a reputation result. Different reputation thresholds can be used. For example, reputation thresholds can include known good, potentially malicious/unknown, and malicious. Other thresholds can be used, including different numbers of thresholds. In an embodiment, at sub-step 606, UEM service 304 caches the reputation result for the application if the reputation result has not been previously cached. Reputation result caching is discussed below with respect to FIG. 7.

At step 608, UEM service 304 determines whether application is reputable based on the reputation result. If the application is deemed malicious, method 550B proceeds to step 610, where UEM service 304 notifies UEM driver 302 to prevent the application from being launched. UEM driver 302 then stops the application process from being created. If the application is deemed potentially malicious/unknown, method 550B proceeds to step 518. At step 518, UEM service 304 notifies UEM driver 302 to resume creation of the application process. The application keeps its default SC (e.g., a user SC 324) and thus does not gain administrator privileges through privilege elevation. If the application happens to be malware, this least privilege approach can limit the extent of the attack. If the application is deemed known good, method 550B proceeds to step 512. Steps 512-518 are discussed above in FIG. 5.

Figure 7:
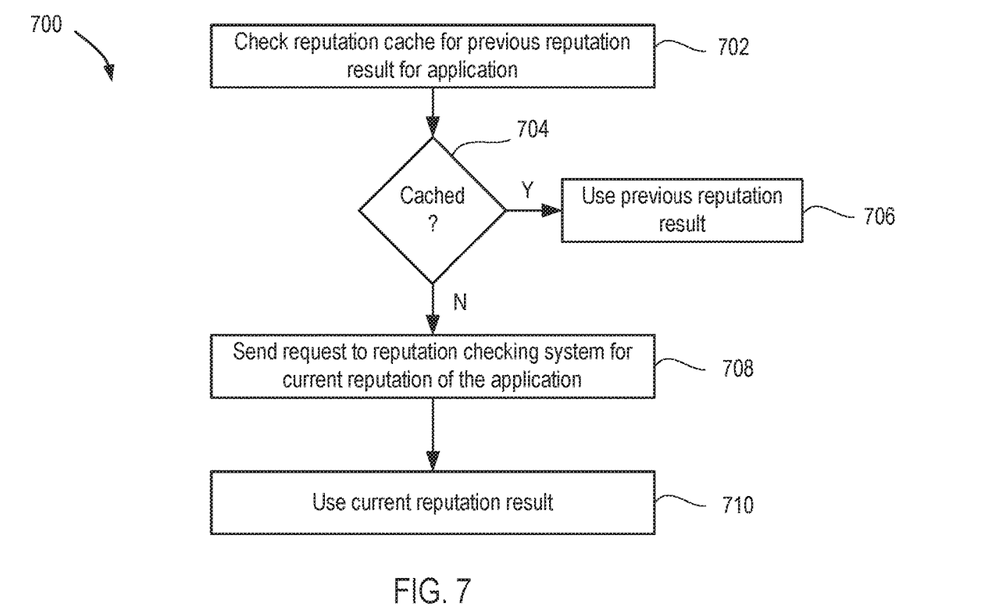
FIG. 7 is a flow diagram depicting a method of determining reputation of an application according to an embodiment.

FIG. 7 is a flow diagram depicting a method 700 of determining reputation of an application according to an embodiment. Checking for application reputation may take a few seconds if external reputation checking systems are used. This can result in a noticeable delay in application launch. To mitigate such a delay, UEM service 304 can cache reputation results for applications. UEM service 304 can maintain a reputation cache 340 in database 338 (FIG. 3). In this manner, only the first launch of a given application results in a delay for performing the reputation check using an external reputation checking service. UEM service 304 will use a cached reputation result for subsequent application launches (as long as the application executable remains the same).

Method 700 begins at step 702, where UEM service 304 checks reputation cache 340 for a previous reputation result for the application being launched. In an embodiment, UEM service 304 computes a hash of the image of the application being launched (e.g., its executable file). The hash of the application image is used as a key to search for a previous reputation result. At step 704, if a reputation result for the application has been cached, method 700 proceeds to step 706, where UEM service 304 uses the previous reputation result in reputation cache 340 as the reputation result. Otherwise, method 700 proceeds to step 708.

At step 708, UEM service 304 sends a request to a reputation checking system for a current reputation of the application being launched. UEM service 304 can query for the reputation using the computed hash of the application image. At step 710, UEM service 304 uses the current reputation returned from the reputation checking system as the reputation result. As noted above, at sub-step 606, UEM service 304 can add the current reputation to reputation cache 340.

UEM service 304 can cache several reputation results for the various applications being launched on the endpoint. In an embodiment, the endpoint can be configured with an endpoint security manager 342. Endpoint security manager 342 is configured as an agent of an endpoint security system that manages security of various endpoints on the network. Endpoint security manager 342 can distribute reputation results in reputation cache 340 to other endpoints. In this manner, reputation results can proliferate among the various endpoints on the network, further reducing the probability of a delay in application launch due to external reputation check.

Figure 8:
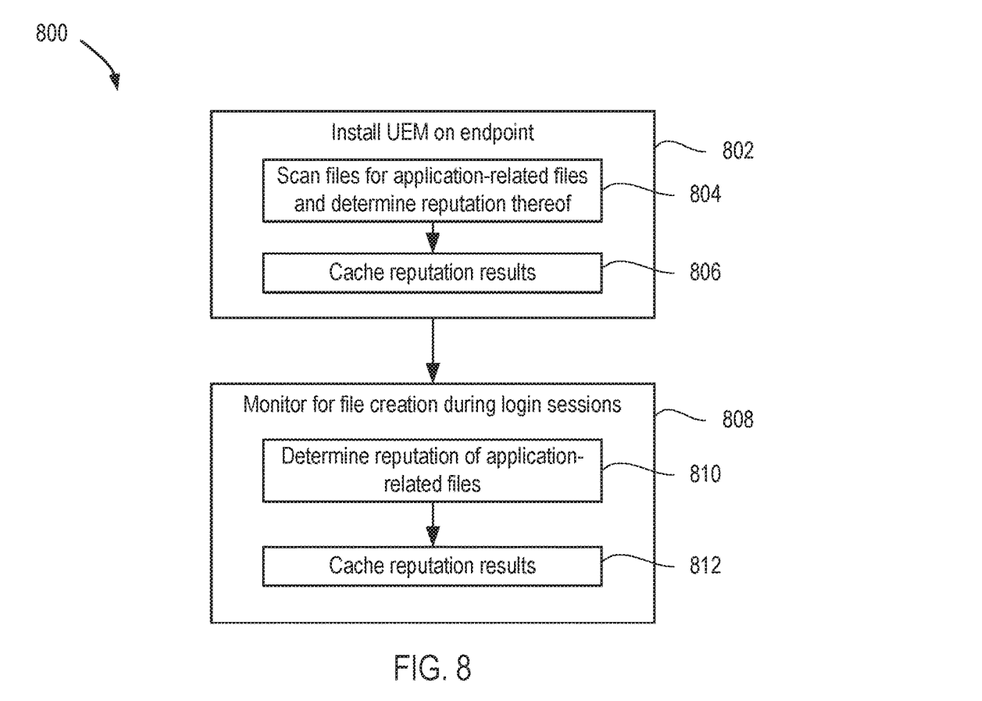
FIG. 8 is a flow diagram of a method for reducing application launch delay due to external reputation checking according to an embodiment.

FIG. 8 is a flow diagram of a method 800 for reducing application launch delay due to external reputation checking according to an embodiment. Method 800 begins at step 802, where UEM installer 336 installs UEM endpoint software 222 (e.g., UEM driver 302, UEM service 304, and UEM agent 310). During the installation process, at sub-step 804, UEM installer 336 scans files 328 for application-related files and determines the reputation thereof. That is, UEM installer 336 can perform install-time priming of reputation cache 340. For example, UEM installer 336 can search for executable files and execute a batch reputation check with an external reputation checking system for unknown files. UEM installer 336 can include a whitelist with applications that are pre-designated as known good. UEM installer 336 can also use a whitelist of pre-designated publishers so that reputation checks are skipped for known publishers (e.g., Microsoft, Adobe, Google, etc.). At sub-step 806, UEM installer 336 caches the reputation results in reputation cache 340.

At step 808, after being installed, UEM driver 302 can monitor for file creation during login sessions 306. UEM driver 302 can be a filesystem filter and can receive notifications from OS 218 for all files that are created. UEM driver 302 can thus detect creation of an application executable file. UEM driver 302 can then notify UEM service 304 of the created executable file. At sub-step 810, UEM service 304 determines reputation of the application related files in a manner described above. At sub-step 812, UEM service 304 caches the reputation results for the application related files. Thus, when the user or administrator installs a new application, UEM endpoint software 222 performs a reputation check before the user attempts to launch the application. This avoids adding delay to application launch due to external reputation checking.

Figure 9:
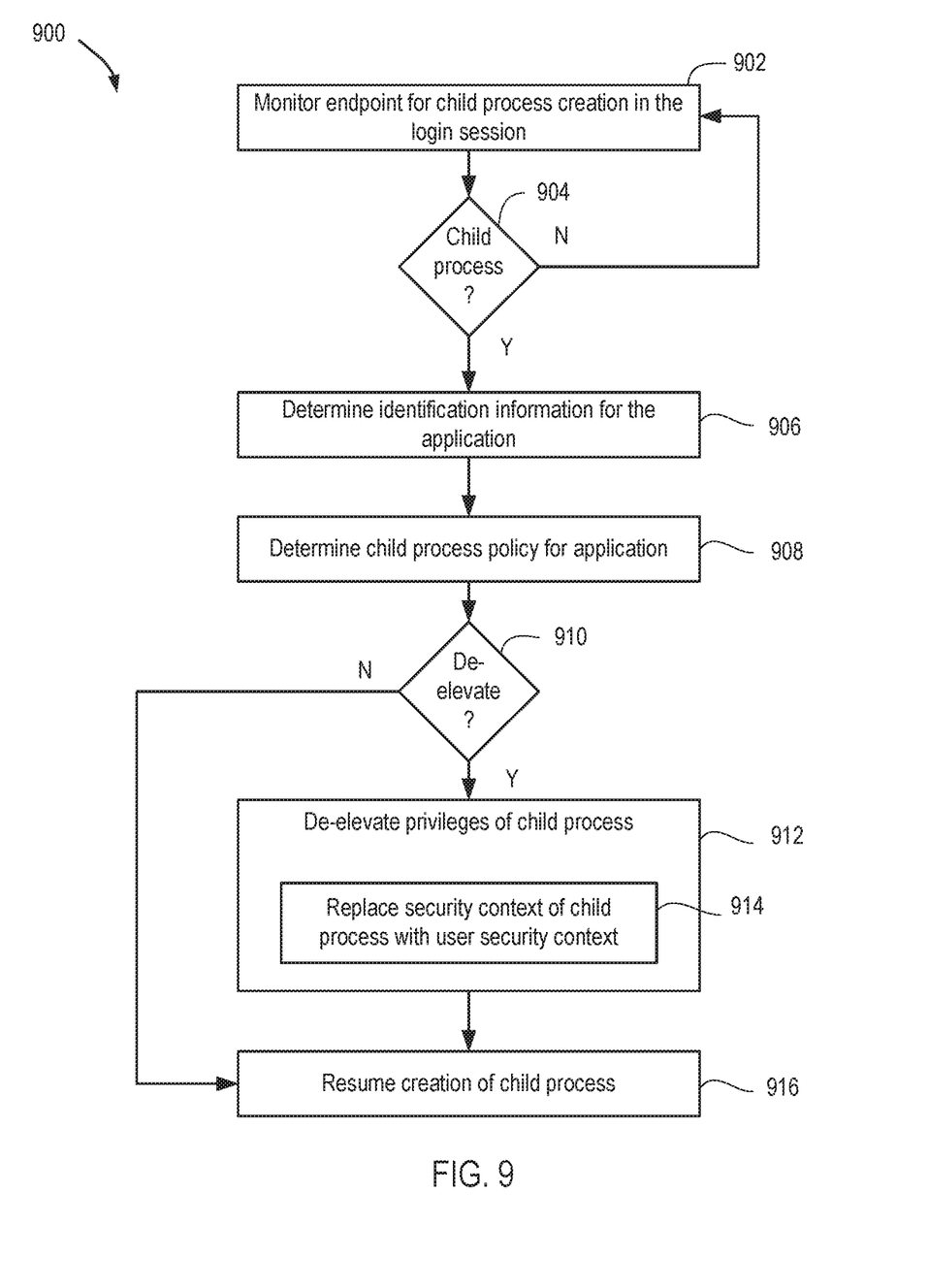
FIG. 9 is a flow diagram depicting a method of handling child process privilege de-elevation in a dynamic privilege management scheme at an endpoint according to an embodiment.

FIG. 9 is a flow diagram depicting a method 900 of handling child process privilege de-elevation in a dynamic privilege management scheme at an endpoint according to an embodiment. By default, when OS 218 creates a child process of the application process, the child process inherits process security context 312 of the application. If the application process has a special SC 326, then the child process would inherit administrator privileges. This may be undesirable. For example, a word processor application may need elevated privileges, but a print spooler child process should not have such elevated privileges. In an embodiment, an administrator can configure policies 344 to dictate de-elevation of child processes for applications.

Method 900 begins at step 902, where UEM driver 302 monitors OS 218 for child process creation in login session 306. UEM driver 302 registers with OS 218 for child process creation notification. Thus, on every child process created, OS 218 calls UEM driver 302 with details of the child process. At step 904, UEM driver 302 waits for such a notification. While none is received, method 900 continues monitoring at step 902. When UEM driver 302 receives a child process creation notification from OS 218, method 900 proceeds to step 906.

At step 906, UEM driver 302 determines identification information for the application for the child process. UEM driver 302 can obtain application details from the notification sent by the OS 218 for creation of the child process, such as application file name and application file path. UEM driver 302 can also determine and/or compute other information, such as application name, application hash value, etc. At step 908, UEM driver 302 determines child process policy for the application. UEM driver 302 can obtain the child process policy from policies 344. The policy can dictate whether or not child processes of the identified application should be de-elevated.

At step 910, UEM driver 302 determines whether the child process should be de-elevated based on policies 344. If not, method 900 proceeds to step 916, where UEM driver 302 resumes creation of the child process. Otherwise, method 900 proceeds to step 912. At step 912, UEM driver 302 sends a request to UEM service 304, which de-elevates privileges of the child process. In an embodiment, at sub-step 914, UEM service 304 replaces a process SC 312 in the child process with a user SC 324 that includes user privileges. Method 900 proceeds to step 516 discussed above.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of dynamic privilege management in a computer system, comprising:
    detecting, by a user environment manager (UEM) service, launch of an application by a user in a login session of a desktop executing on the computer system;
    determining identification information for the application;
    evaluating at least one policy that specifies requirements for privilege elevation using the identification information as parametric input;
    generating a privilege elevation result for the application, the privilege evaluation result including a positive or negative indication of whether the at least one policy permits privilege elevation of a process to be created for the application within the login session;
    determining a reputation of the application and comparing the reputation against at least one reputation threshold to generate a reputation result for the process, the reputation result including a positive or negative indication of whether the process can be executed; and
    elevating privilege of the process in response to the privilege elevation result after evaluation of the reputation result by creating, by the UEM service, an instance of a UEM agent within the login session having privileges sufficient to create security contexts, and replacing, but the UEM agent, a security context of the process with a special security context.

2. The method of claim 1, further comprising:
    creating the process having the elevated privilege.

3. The method of claim 2, wherein
    the security context of the process includes first privileges assigned to the user in the current session, and wherein the special security context includes second privileges that are more privileged than the first privileges.

4. The method of claim 3, further comprising:
    creating the special security context in response to creation of the login session of the desktop, the special security context including, in addition to the second privileges, attributes of a security context assigned to the user in the current session.

5. The method of claim 1, wherein the reputation satisfies a first reputation threshold, wherein the reputation result includes the positive indication, and wherein the method further comprises:
    elevating privilege of the process in response to the positive indication in the privilege elevation result; and
    creating the process.

6. The method of claim 1, wherein the reputation is between a first reputation threshold and a second reputation threshold, wherein the reputation result includes the positive indication, and wherein the method further comprises:
    creating the process, which includes a user security context having privileges assigned to the user in the current session.

7. The method of claim 1, wherein the reputation fails to satisfy a reputation threshold, wherein the reputation result includes the negative indication, and wherein the method further comprises:
    preventing execution of the process.

8. The method of claim 1, further comprising:
    de-elevating privilege of a child process of the process.

9. The method of claim 1, wherein the step of determining the reputation comprises:
    caching the reputation result for the application;
    searching a cache of reputation results for a prior reputation result for the application; and
        providing the prior reputation result as the reputation result in response to the prior reputation result being in the cache.

10. The method of claim 1, wherein the step of determining the reputation comprises:
    searching a cache of reputation results for a prior reputation result for the application;
    sending a request for a current reputation result to a reputation checking system in response to absence of the prior reputation result in the cache; and
    providing the current reputation result as the reputation result as received from the reputation service.

11. The method of claim 1, further comprising:
    distributing the reputation of the application to a plurality of other computer systems for caching and use in reputation checking.

12. A non-transitory computer readable medium having instructions stored thereon that when executed by a processor cause the processor to perform a method of dynamic privilege management in a computer system, comprising:
    detecting, by a user environment manager (UEM) service, launch of an application by a user in a login session of a desktop executing on the computer system;
    determining identification information for the application;
    evaluating at least one policy that specifies requirements for privilege elevation using the identification information as parametric input;
    generating a privilege elevation result for the application, the privilege evaluation result including a positive or negative indication of whether the at least one policy permits privilege elevation of a process created for the application within the current session;

determining a reputation of the application and comparing the reputation against at least one reputation threshold to generate a reputation result for the process, the reputation result including a positive or negative indication of whether the process can be executed; and elevating privilege of the process in response to the privilege elevation result after evaluation of the reputation result by creating, by the UEM service, an instance of a UEM agent within the login session having privileges sufficient to create security contexts, and replacing, but the UEM agent, a security context of the process with a special security context.

13. The non-transitory computer readable medium of claim 12, further comprising:
creating the process having the elevated privilege.

14. The non-transitory computer readable medium of claim 12, further comprising:
caching the reputation result for the application;
searching a cache of reputation results for a prior reputation result for the application; and
providing the prior reputation result as the reputation result in response to the prior reputation result being in the cache.

15. A computer system, comprising:
a hardware platform having a central processing unit (CPU) and a memory;
a software platform comprising code stored in the memory and executable by the CPU to cause the software platform to:
detect, by a user environment manager (UEM) service, launch of an application by a user in a login session of a desktop environment of the software platform;
determine identification information for the application;
evaluate at least one policy that specifies requirements for privilege elevation using the identification information as parametric input;
generate a privilege elevation result for the application, the privilege evaluation result including a positive or negative indication of whether the at least one policy permits privilege elevation of a process created for the application within the current session;
determine a reputation of the application and comparing the reputation against at least one reputation threshold to generate a reputation result for the process, the reputation result including a positive or negative indication of whether the process can be executed; and
elevate privilege of the process in response to the privilege elevation result after evaluation of the reputation result by creating, by the UEM service, an instance of a UEM agent within the login session having privileges sufficient to create security contexts, and replacing, but the UEM agent, a security context of the process with a special security context.

16. The computer system of claim 15, wherein the code is executable by the CPU to cause the software platform to:
create the process having the elevated privilege.

17. The computer system of claim 15, wherein the code is executable by the CPU to cause the software platform to:
cache the reputation result for the application;
search a cache of reputation results for a prior reputation result for the application; and
provide the prior reputation result as the reputation result in response to the prior reputation result being in the cache.

18. The computer system of claim 15, wherein the code is executable by the CPU to cause the software platform to:
search a cache of reputation results for a prior reputation result for the application;
send a request for a current reputation result to a reputation checking system in response to absence of the prior reputation result in the cache; and
provide the current reputation result as the reputation result as received from the reputation service.

* * * * *